United States Patent [19]

Barenyi

[11] 3,939,934
[45] Feb. 24, 1976

[54] LONGITUDINAL BEARER ARRANGEMENT IN VEHICLES
[75] Inventor: Béla Barényi, Maichingen, Germany
[73] Assignee: Daimler-Benz Aktiengesellschaft, Germany
[22] Filed: Mar. 27, 1974
[21] Appl. No.: 455,405

Related U.S. Application Data
[63] Continuation-in-part of Ser. No. 190,746, Oct. 20, 1971, abandoned.

[30] Foreign Application Priority Data
Oct. 22, 1970 Germany............................ 2051773

[52] U.S. Cl. ......... 180/54 R; 280/106 R; 296/28 F; 296/28 K; 296/64
[51] Int. Cl.² ........................................ B62D 21/00
[58] Field of Search ..... 280/106 R; 296/28 R, 28 F, 296/28 K, 64, 137 R, 63; 180/54 R, 64 R

[56] References Cited
UNITED STATES PATENTS

| | | | |
|---|---|---|---|
| 1,704,451 | 3/1929 | Windberger | 180/64 R |
| 2,121,497 | 6/1938 | Broulhiet | 280/106 R |
| 2,839,329 | 6/1958 | Wilfert | 296/28 K |
| 3,101,126 | 8/1963 | Herr | 180/64 R |
| 3,352,597 | 11/1967 | Barenyi et al | 296/64 |

FOREIGN PATENTS OR APPLICATIONS

| | | | |
|---|---|---|---|
| 1,132,328 | 10/1956 | France | 280/106 R |
| 548,897 | 10/1942 | United Kingdom | 280/106 R |

Primary Examiner—M. Henson Wood, Jr.
Assistant Examiner—David M. Mitchell
Attorney, Agent, or Firm—Craig & Antonelli

[57] ABSTRACT

A longitudinal bearer arrangement in vehicles, especially in passenger motor vehicles, in which the longitudinal bearers rise in the vehicle longitudinal direction from the rear section of the vehicle to the front section.

19 Claims, 4 Drawing Figures

LONGITUDINAL BEARER ARRANGEMENT IN VEHICLES

This application is a continuation-in-part of Application Ser. No. 190,746, filed Oct. 20, 1971, now abandoned, and the benefit of the filing date of said prior application is claimed for common subject matter.

The present invention relates to a longitudinal bearer arrangement in vehicles, especially passenger motor vehicles.

A motor vehicle is known in the art (British Pat. No. 728,593 and French Pat. No. 1,059,830) in which the longitudinal bearers are arranged paralled to the vehicle longitudinal axis and are arranged in a horizontal plane. The driver seat arranged in the center of the motor vehicle is slightly raised in the seating plane with respect to the slightly set-back co-driver seats provided laterally of the driver seat so that an inclination of the seat surfaces in the direction toward the rear section of the vehicle results. The advantage of this arrangement resides in that the driver seated in a raised position with respect to the co-drivers receives a good view over the entire vehicle and that, on the other, the lower-seated co-drivers receive an optimum head clearance and large space-comfort. However, when the motor vehicle rolls over, a large distance between the roof plane of the vehicle extending parallel to the longitudinal bearers and the longitudinal bearers has proved to be disadvantageous because the rigidity of the vehicle construction decreases with increasing distance of the roof surface from the longitudinal bearers, provided the constructive expenditures are not enlarged. Additionally, it is also disadvantageous that the vehicle equipped with the known longitudinal bearer arrangement may readily come into contact with and become seated on the ground in case of road unevenness, i.e. may hit the ground and become stuck, for example, in the open terrain, especially when the vehicle is loaded in the front section thereof by luggage and dynamically spring-deflects inwardly, i.e. downwardly.

In a small vehicle with a rear-engine provided preferably for city traffic, such as in U.S. Pat. No. 3,352,597 and German publication DOS No. 1,430,871, published Dec. 12, 1968, by Barenyi and Sacco, it is disclosed to provide the seat planes of the driver seat and of the co-driver seat arranged to the rear of the driver with an inclination sloping down toward the rear section of the vehicle. With this prior art arrangement, exclusively the floor sheet metal plate is inclined in direct proximity of the driver seat in the rearward, downward direction by 1/10 degrees with respect to the horizontally arranged longitudinal bearers of the vehicle so that the distance between the knee joint of the driver and the floor plate is not increased by the inclination of the driver seat in the direction toward the rear. This prior art vehicle provided for city traffic, however, entails essentially the same disadvantages of the long roof columns as the prior art vehicle described in the British Pat. No. 728,593.

The present invention is concerned with the task to eliminate the disadvantages provided by the known longitudinal bearer arrangements in vehicles and to provide a motor vehicle, in which the rigidity of the vehicle construction and therewith the safety during accident impacts is improved by a favorable longitudinal bearer arrangement and by simple constructive measures with the simultaneous reduction of the vehicle weight and in which the mounting and connections of seats, drive unit parts or the like is facilitated.

The underlying problems are solved according to the present invention in that the longitudinal bearers rise in the vehicle longitudinal direction from the rear part of the vehicle in the direction towards the front part. It is achieved by these measures that the accident impacts impinging on the vehicle from in front or from the side thereof, are not disposed directly in the longitudinal plane of the longitudinal bearers and instead lift the vehicle so that already by the conversion of the kinetic impact energy into rotation energy, a decrease of the accident impacts is produced. It is furthermore possible in an advantageous manner by the forwardly rising longitudinal bearers that the vehicle body is considerably reinforced by reason of the reduced distance in the forward part of the vehicle between the roof plane and the longitudinal bearers so that the safety of the vehicle passengers is increased also during rolling over. A further advantage of the construction of the present invention resides in the increased floor or ground clearance of the vehicle. Due to the forwardly raised longitudinal bearers, the danger of contact and of a seating of the vehicle on the ground, when loaded and when carrying out downward spring deflections, is reduced.

In a further advantageous construction of the present invention, the longitudinal bearers may extend parallel to the joint shaft of, for example, a vehicle equipped with front engine and rear drive, as viewed in top plan view and/or side view, whereby the assembly of the joint shaft at the floor surfaces of the vehicle extending parallel to the longitudinal bearers is facilitated. Furthermore, it has proved particularly appropriate for the assembly of the body if eventually provided separating planes of the framework extend perpendicularly to the longitudinal bearers.

Accordingly, it is an object of the present invention to provide a motor vehicle, especially passenger motor vehicle which avoids by simple means the aforementioned shortcomings and drawbacks encountered in the prior art.

Another object of the present invention resides in a longitudinal bearer arrangement for vehicles which increases the safety of the passengers and driver of the vehicle without significant increases in constructional expenditures.

A still further object of the present invention resides in a longitudinal bearer arrangement for passenger motor vehicles which permits an increase in the rigidity of the vehicle construction with simultaneous reduction of the vehicle weight while simultaneously facilitating the assembly of the various vehicle parts.

Still another object of the present invention resides in a motor vehicle in which the danger of getting stuck on road unevenness, especially in open terrain, is considerably minimized.

These and further objects, features and advantages of the present invention will become more apparent from the following description when taken in connection with the accompanying drawings which show, for purposes of illustration only, an embodiment in accordance with the present invention, and wherein.

Figure 1:
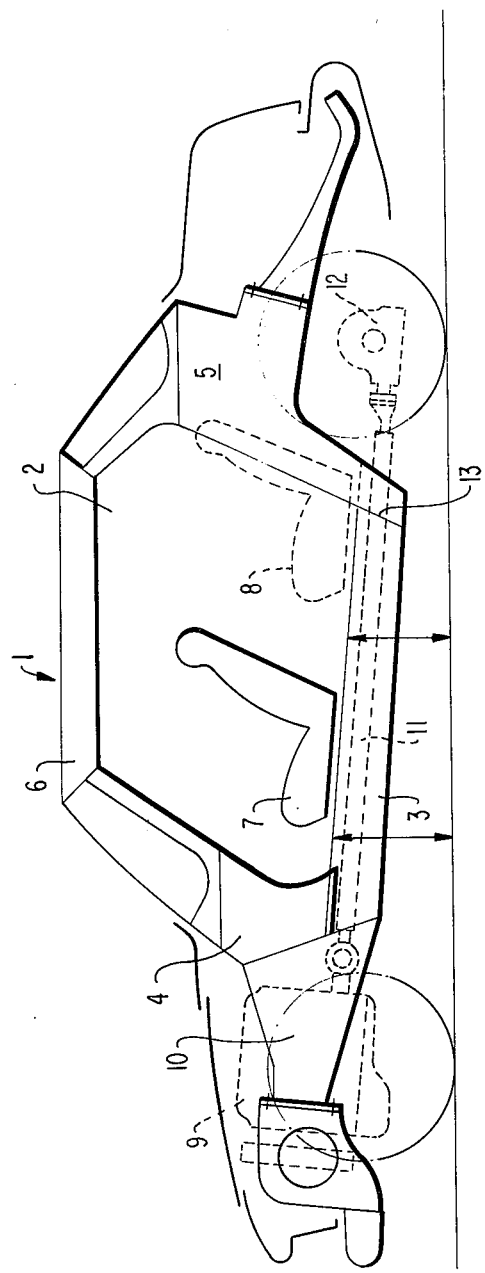
FIG. 1 is a somewhat schematic side view, partially in cross section, of a motor vehicle in accordance with the present invention.

Referring now to FIG. 1, the motor vehicle generally designated by reference numeral 1 and illustrated in this Figure partially in cross section includes a vehicle passenger cell 2 which is constituted essentially by the forwardly rising longitudinal bearers 3 and the front cross frame 4 and rear cross frame 5 connected thereto as well as by the roof structure 6. As can be clearly seen from this Figure, the longitudinal bearer 3 rises with respect to the horizontal ground plane by an angle of about 5°. Furthermore, it may be seen from FIG. 1 that the longitudinal bearers extend only in the zone of the passenger compartment between the front and rear wheels. Moreover, it is contemplated that the longitudinal bearer extends in the longitudinally extending plane formed by the front and rear wheels on each side of the vehicle.

The longitudinal bearers 3 limit the door cut outs in the downward direction of the vehicle, and simultaneously represent the lateral bottom limit of the vehicle in the zone of the passenger compartment. That is, the longitudinal bearers 3 are connected with each other by the vehicle floor extending between the bearers 3 which are laterally spaced from one another as may be seen in FIGS. 2–4. The seats 7 and 8 are directly arranged on the vehicle floor so that the advantage of a higher seat arrangement of the driver compared to that of the passengers, together with simultaneous reduction of the lever arm from the center of gravity of the vehicle to the ground surface remains preserved. As may be further seen in FIGS. 2–4, the longitudinal bearers 3 are connected by means of the transverse cross beams 4 and 5, which may be disposed at the level on the lower edges of the windshield and/or the rear window and connected to the longitudinal bearers 3 by vertical supports 14 and 15. The vertical supports 14 and 15 may be slightly inclined toward the front and rear respectively in relation to the longitudinal bearers 3. These vertical supports 14 and 15 as may be seen in FIG. 4, for example, are arranged in the longitudinal plane at each side of the vehicle in which the longitudinal bearers 3 are included. The framework structure defined by the longitudinal bearers 3 and the front cross frame member 4 and rear cross frame 5 define the extent of the passenger compartment.

Toward the front and rear of the vehicle, end sections adjoin the transverse frames 4 and 5. These end sections are fashioned preferably to be more susceptible to deformation than the passenger compartment in order to absorb kinetic impact energy by deformation in case of an accident while the passenger compartment is still resistent to such deformation. The end section in the front may be, for example, the longitudinal support girder 10 between which the engine 9 of the vehicle is arranged. The joint shaft or Cardan shaft 11 for the rear drive 12 of the vehicle can then be supported in the vehicle advantageously in parallel to the longitudinal bearers 3.

Figure 2:
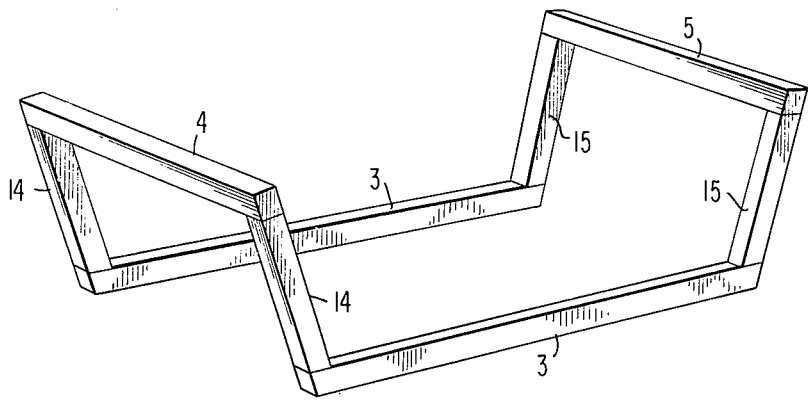
FIG. 2 is a somewhat schematic perspective view of the framework in a motor vehicle according to the present invention.
Figure 3:
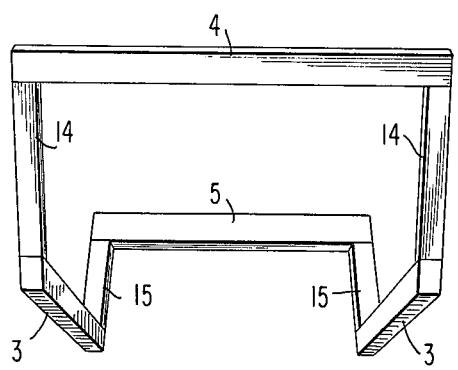
FIG. 3 is a front view in perspective of the framework shown in FIG. 2.
Figure 4:
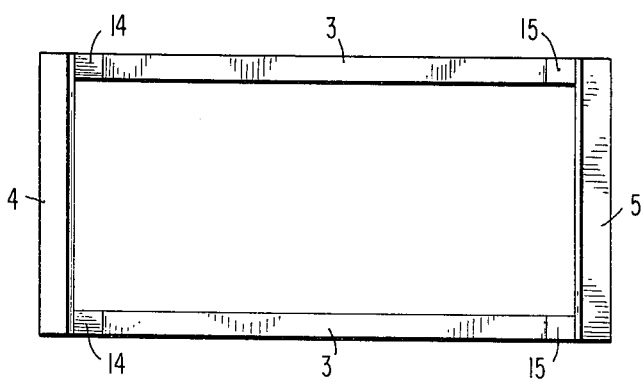
FIG. 4 is a top plan view of the framework structure of FIG. 2.

Thus the framework members of this vehicle construction may be joined as seen for example in FIGS. 2–4. This structural arrangement provides an assembly that is constructionally simple but yet the forces can be absorbed in the framework to the greatest possible extent with the avoidance of shearing and torsional stresses. In particular, the structural arrangement includes the cross bearer members in planes that are at right angles to the planes in which the longitudinally extending bearers 3 are provided. Furthermore, because of the inclination of the longitudinal bearer members from the rear to the forward portion of the vehicle a larger ground clearance is obtained at the front of the vehicle, on the one hand, while, on the other hand, the length of the vertical supports 14 of the forward transverse frame 4 is shortened, for example, in comparison with the rear supports 15. As a result of this reduced length, these vertical supports of the forward transverse frame can absorb greater forces in the case of vertical stresses, i.e. if the vehicle is overturned due to an accident, without having to enlarge the cross section. This results very simply from the fact that the buckling resistance is the decisive factor for these supports during stress thereon, which buckling resistance is a function of their length. In this connection, it is to be kept in mind that the shortening of the length is important since the cross section of the vertical supports can not be chosen arbitrarily in most cases because otherwise the possible door cut out and the leg freedom of the passengers is impaired.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. A framework arrangement for vehicles comprising at least two parallel transversely spaced longitudinal bearer members extending only between the areas of the front and rear wheels at each side of a vehicle, said at least two longitudinal bearer members rising from the horizontal upwardly from the area of the rear wheels to the area of the front wheels, forward and rearward cross frame means for connecting said at least two longitudinal bearer members, and at least one vehicle floor connected to said at least two longitudinal bearer members and having the inclination of the longitudinal bearer members.

2. A framework arrangement according to claim 1, wherein said at least two longitudinal bearer members extend substantially parallel to a joint shaft as viewed in top plan view.

3. A framework arrangement according to claim 2, wherein said at least two longitudinal bearer members extend substantially parallel to the joint shaft as viewed in side view.

4. A framework arrangement according to claim 3, wherein the vehicle is equipped with a front engine and a rear drive interconnected by the joint shaft.

5. A framework arrangement according to claim 4, wherein said cross frame means are disposed in transverse planes and said at least two longitudinal bearer members are disposed in longitudinal planes, said transverse planes extending substantially perpendicularly to said longitudinal planes.

6. A framework arrangement according to claim 1, wherein said at least two longitudinal bearer members extend substantially parallel to a joint shaft as viewed in side view.

7. A framework arrangement according to claim 1, wherein a front engine and a rear drive interconnected by a joint shaft are included, said joint shaft extending substantially parallel to the at least two longitudinal bearer members.

8. A framework arrangement according to claim 1, wherein said cross frame means are disposed in transverse planes and the at least two longitudinal bearer members are disposed in longitudinal planes, said transverse planes extending substantially perpendicularly to the longitudinal planes.

9. A framework arrangement according to claim 1, wherein said at least two longitudinal bearer members rise from the rear wheels to the front wheels of the vehicle by an angle of about 5°.

10. A framework arrangement according to claim 1, wherein vehicle passenger seats are directly disposed on the vehicle floor means.

11. A framework arrangement according to claim 10, wherein the seats in the front section of the vehicle are disposed higher with respect to ground level than the seats in the rear section.

12. A framework arrangement according to claim 1, wherein the at least two longitudinal bearer members at the front wheels of the vehicle are disposed at a reduced distance from a roof plane of the vehicle than the distance between the at least two longitudinal bearer members at the rear wheels of the vehicle and the roof plane whereby rigidity of construction of the vehicle is increased.

13. A framework arrangement according to claim 1, wherein the at least two longitudinal bearer members at the front wheels of the vehicle are disposed at a reduced distance from a roof plane of the vehicle than the distance between the at least two longitudinal bearer members at the rear wheels of the vehicle and the roof plane, whereby rigidity of construction of the vehicle is increased, and wherein the at least two longitudinal bearer members at the front wheels of the vehicle rise to a distance whereby the ground clearance of the vehicle is increased.

14. A framework arrangement according to claim 1, wherein the at least two longitudinal bearer members at the front wheels of the vehicle rise to a height above the ground whereby the ground clearance of the vehicle is increased at the front wheels.

15. A framework arrangement according to claim 1, wherein said at least two longitudinal bearer members extend in the longitudinal planes formed by the front and rear wheels at each side of the vehicle.

16. A framework arrangement according to claim 1, wherein said forward and rearward cross frame means each include vertical support members connecting respective cross frame means with said at least two longitudinal bearer members.

17. A framework arrangement according to claim 16, wherein said vertical support members are slightly inclined from the vertical in the forward and rearward directions respectively corresponding to a connection with the forward and rearward cross frame means.

18. A framework arrangement according to claim 1, wherein a front end section means is connected to said forward cross frame means and said at least two longitudinal bearer members for absorbing impact energy directed at the front end of the vehicle.

19. A framework arrangement according to claim 1, wherein a rear end section means is connected to said rearward cross frame means and said at least two longitudinal bearer members for absorbing impact energy directed at the rear end of the vehicle.

* * * * *